US012562998B2

(12) United States Patent
Hache

(10) Patent No.: US 12,562,998 B2
(45) Date of Patent: Feb. 24, 2026

(54) LINK MONITOR FOR A SWITCH HAVING A PCIE-COMPLIANT INTERFACE, AND RELATED SYSTEMS, DEVICES, AND METHODS

(71) Applicant: Microchip Technology Incorporated, Chandler, AZ (US)

(72) Inventor: Vincent Hache, Vancouver (CA)

(73) Assignee: Microchip Technology Incorporated, Chandler, AZ (US)

( * ) Notice: Subject to any disclaimer, the term of this patent is extended or adjusted under 35 U.S.C. 154(b) by 598 days.

(21) Appl. No.: 17/664,334

(22) Filed: May 20, 2022

(65) Prior Publication Data

US 2022/0400089 A1      Dec. 15, 2022

Related U.S. Application Data

(60) Provisional application No. 63/202,382, filed on Jun. 9, 2021.

(51) Int. Cl.
H04L 49/00 (2022.01)
H04L 49/15 (2022.01)
H04L 49/25 (2022.01)

(52) U.S. Cl.
CPC .......... H04L 49/3009 (2013.01); H04L 49/15 (2013.01); H04L 49/25 (2013.01)

(58) Field of Classification Search
CPC ...... H04L 49/3009; H04L 49/15; H04L 49/25
See application file for complete search history.

(56) References Cited

U.S. PATENT DOCUMENTS 11,200,096 B1 * 12/2021 Shenbagam ........ G06F 9/44505
2014/0237156 A1   8/2014 Regula et al.
2017/0046293 A1   2/2017 Lasater

OTHER PUBLICATIONS

Ming-Hung Chen et al., 'Towards a Single-host Many-GPU System', 2018, 30th International Symposium on Computer Architecture and High Performance Computing, pp. 140-147. (Year: 2018).*
I-Hsin Chung et al.: "Towards a Composable Computer System", High Performance Computing in Asia-Pacific Region, Jan. 28, 2018, pp. 137-147.
International Search Report for International Application No. PCT/US2022/072476, mailed Sep. 6, 2022, 6 pages.
International Written Opinion for International Application No. PCT/US2022/072476, mailed Sep. 6, 2022, 5 pages.

* cited by examiner

*Primary Examiner* — Melvin C Marcelo
(74) *Attorney, Agent, or Firm* — TraskBritt

(57)      ABSTRACT

Some embodiments relate to a link monitor for a switch having a PCIe-compliant interface. Some embodiments relate to an apparatus including a Peripheral Component Interconnect Express (PCIe)-compliant interface provided at a PCIe domain of a switch. The apparatus may also include a link monitor provided at a switching fabric of the switch that supports the PCIe domain of the switch. The link monitor to observe a factor-changing event of a state of a fabric link and obtain a value at least partially responsive to a weight computation, the weight computation for a factor associated with the factor-changing event. Related devices, systems and methods are also disclosed.

23 Claims, 9 Drawing Sheets

LINK MONITOR FOR A SWITCH HAVING A PCIE-COMPLIANT INTERFACE, AND RELATED SYSTEMS, DEVICES, AND METHODS

CROSS-REFERENCE TO RELATED APPLICATIONS

This application claims the benefit of the priority date of U.S. Provisional Patent Application No. 63/202,382, filed Jun. 9, 2021, and titled "AUTOMATIC DEVICE-TO-DEVICE ROUTE PATHFINDING FOR PCIE FABRICS USING SHORTESTPATH ALGORITHMS," the disclosure of which is incorporated herein in its entirety by this reference.

FIELD

This description relates, generally, to a link monitor for a switch. More specifically, some examples relate to a link monitor for a switch having a PCIe-compliant interface, without limitation. Related devices, systems, and methods are also disclosed.

BACKGROUND

As the use of graphical processing units (GPUs) for deep learning, artificial intelligence, and machine learning increases, as non-limiting examples, so does the demand for a more efficient deployment of GPU and non-volatile memory express (NVMe) resources. To effectively integrate these costly devices into systems, datacenter-equipment designers require innovative technologies for efficiently sharing system resources among multiple hosts with a high-bandwidth, low-latency interconnection in disaggregated, composable architectures.

Peripheral Component Interconnect Express (PCIe), specified by the Peripheral Component Interface Special Interest Group, of Beaverton, Oregon, is an effective, high-performance, and ubiquitous system interconnect, but there are limitations in the PCIe specification that limit its usage in such designs. For example, the PCIe standard defines a hierarchy domain as a rigid, hierarchical tree structure, which complicates the design of large-scale systems involving multiple PCIe switches and host systems. For example, a simple, PCIe tree structure-based system requires as many links between each switch as there are switches dedicated to each host's PCIe topology. The inability to share these links between the hosts complicates the design and decreases system efficiency.

BRIEF DESCRIPTION THE DRAWINGS

While this disclosure concludes with claims particularly pointing out and distinctly claiming specific examples, various features and advantages of examples within the scope of this disclosure may be more readily ascertained from the following description when read in conjunction with the accompanying drawings, in which:

DETAILED DESCRIPTION

Figure 1:
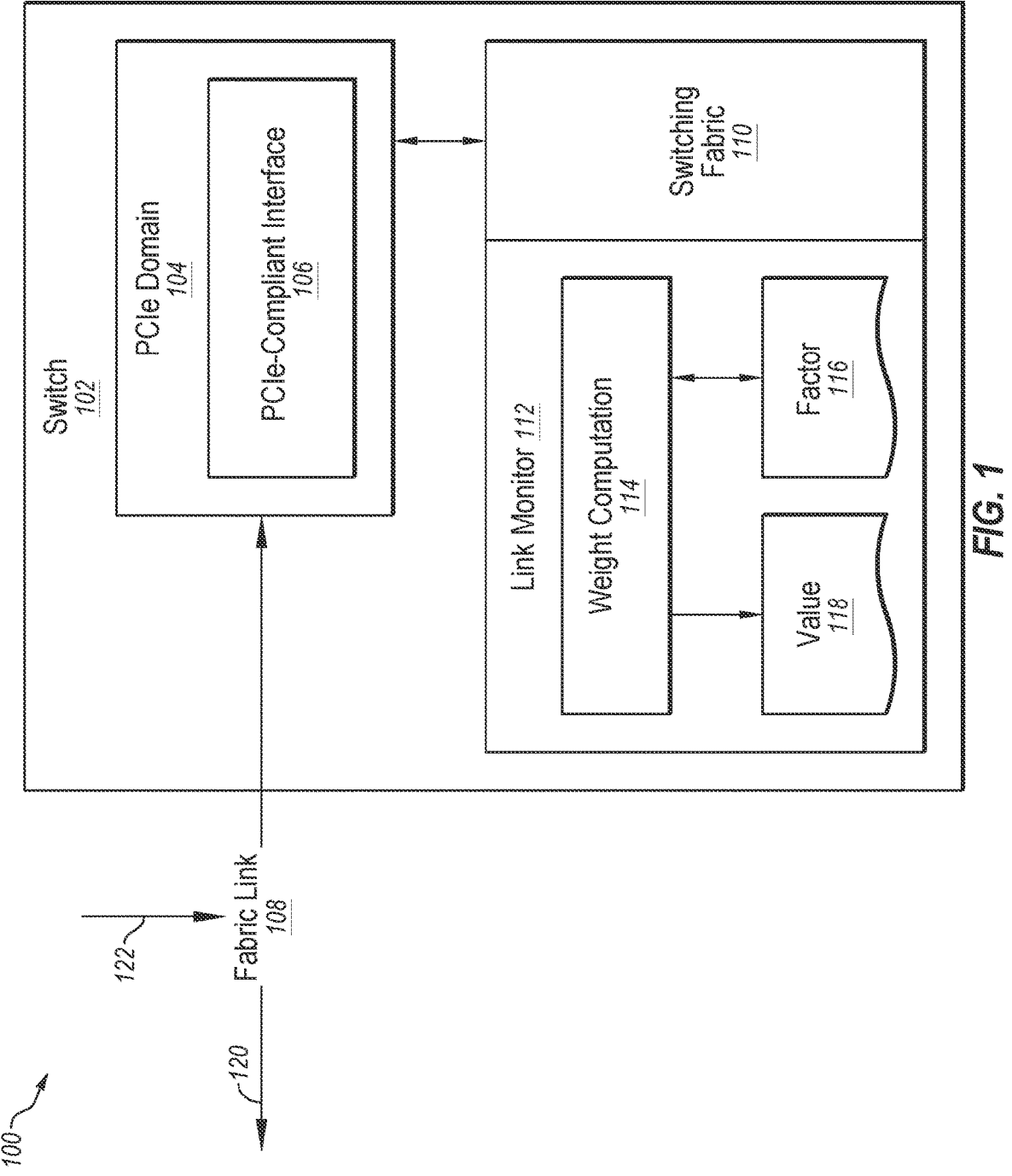
FIG. 1 is a functional block diagram illustrating an apparatus according to one or more examples.

In the following detailed description, reference is made to the accompanying drawings, which form a part hereof, and in which are shown, by way of illustration, specific examples in which the present disclosure may be practiced. These examples are described in sufficient detail to enable a person of ordinary skill in the art to practice the present disclosure. However, other examples may be utilized, and structural, material, and process changes may be made without departing from the scope of the disclosure.

The illustrations presented herein are not meant to be actual views of any particular method, system, device, or structure, but are merely idealized representations that are employed to describe the examples of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an example of this disclosure to the specified components, steps, features, functions, or the like.

It will be readily understood that the components of the examples as generally described herein and illustrated in the drawing could be arranged and designed in a wide variety of different configurations. Thus, the following description of various examples is not intended to limit the scope of the present disclosure, but is merely representative of various examples. While the various aspects of the examples may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be depicted by block diagram form in order not to obscure the present disclosure in unnecessary detail. Conversely, specific implementations shown and described are only examples and should not be construed as the only way to implement the present disclosure unless specified otherwise herein. Additionally, block definitions and partitioning of logic between various blocks is an example of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, and symbols that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal. A person having ordinary skill in the art would appreciate that this disclosure encompasses communication of quantum information and qubits used to represent quantum information.

The various illustrative logical blocks, modules, and circuits described in connection with the examples disclosed herein may be implemented or performed with a general purpose processor, a special purpose processor, a Digital Signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to examples of the present disclosure.

The examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, or a subprogram, without limitation. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

PCIe switching may allow PCIe fabrics to overcome the limitations of conventional PCIe tree-based systems to provide flexible, dynamic composition and sharing of system resources. In the present disclosure, the term "PCIe fabric" may refer to an interconnection of multiple PCIe-compliant interfaces. A PCIe fabric may allow signals (e.g., including data) to traverse the PCIe fabric from one PCIe-compliant interface to another PCIe-compliant interface. However, conventional PCIe switches use statically defined routing paths between nodes, which prevents effective use of new routing paths, automatic handling of broken links, and network performance optimization. Systems requiring such capabilities conventionally implement complex management software (SW), run at a central processing unit (CPU), to monitor fabric link health (at a high level), and update switch routing tables as needed typically using hard-coded, platform-specific alternate paths. Further, these solutions are designed and implemented per platform.

Examples of the present disclosure may monitor fabric links e.g., to determine a 'weight' and apply a shortest path algorithm for route pathfinding in PCIe switch fabrics. In the present disclosure, the term "fabric link" may refer to a logical or communicative connection between two PCIe-compliant interfaces (e.g., through a PCIe fabric, without limitation). Further, examples may run in an embedded fabric switch control firmware (FW) or in an external management CPU. The external management CPU may operate, at least in part, as a dedicated fabric manager. Running examples in the embedded switch control FW (or an external management CPU) may be an improvement compared with systems running management SW at a main CPU because running at the embedded switch control FW (or the external management CPU) may decrease the time required to take any corrective action as a result of updated 'weights' as compared with a running SW in the main CPU. Running examples at the embedded switch control FW (or the external management CPU) may decrease the time required to take any corrective action as a result of updated 'weights' because the embedded switch control FW may have direct access to control the switch routing HW whereas the main CPU may have to construct and transmit a command to the switch to take any corrective action(s). Running examples at the embedded switch control FW (or the external management CPU) also may remove a potential burden on the main CPU, e.g., by not taxing the main CPU with monitoring and/or managing fabric links.

Examples of the present disclosure may allow a system to optimally and efficiently update routing paths to, as a non-limiting example: make use of new fabric links, heal broken routing paths, and/or load balance fabric traffic across redundant paths. Fabric switches may automatically adapt to changes in the fabric topology as systems are taken online or offline, or due to unexpected link-down events.

In the present disclosure, fabric links, including fabric links that are PCIe compliant may, additionally or alternatively, be compute express link (CXL) compliant. CXL is defined by the CXL consortium of Beaverton, Oregon. Further, PCIe-compliant interfaces may, additionally or alternatively, be CXL compliant.

FIG. 1 is a functional block diagram illustrating an example apparatus 100 according to one or more examples. As a non-limiting example, apparatus 100 includes link monitor 112 to monitor fabric link 108 to provide information that may be utilized to update information in a routing table (e.g., weights) responsive to a factor-changing event 122 at fabric link 108.

As a non-limiting example, apparatus 100 may include a PCIe-compliant interface 106 provided at a PCIe domain 104 of a switch 102. Apparatus 100 may also include link monitor 112, provided at a switching fabric 110 of the switch 102. Link monitor 112 may support PCIe domain 104. Link monitor 112 may observe factor-changing event 122 of a state 120 of fabric link 108. Link monitor 112 may obtain a value 118 at least partially responsive to a weight computation 114. Weight computation 114 may be for a factor 116 associated with the factor-changing event 122.

Switch 102 may receive a frame (e.g., a frame encoding data according to a format) at a first interface (e.g., PCIe-compliant interface 106), identify another interface (not illustrated in FIG. 1) of the switch 102 at which to provide the frame, and provide the frame at the other interface.

PCIe domain 104 of switch 102 may include multiple PCIe-compliant interfaces 106 (though only one, i.e., PCIe-compliant interface 106, is illustrated in FIG. 1). Thus, switch 102 may be a PCIe switch, meaning that two or more of the interfaces of switch 102 may be PCIe compliant. In the present disclosure the term "PCIe compliant" may mean that an interface (or device) is capable of communicating (e.g., sending and receiving frames) according to one or more PCIe specifications e.g., the PCIe version 5.0 specification, without limitation. Further, an interface (or device) (e.g., a PCIe-compliant interface) may be capable of communicating according to other specifications, e.g., the Compute Express Link (CXL) 2.0 specification, without limitation. Thus, one or more of the PCIe-compliant interfaces 106 of PCIe domain 104 may also be CXL-compliant.

Switching fabric 110 may manage switching in PCIe domain 104. As a non-limiting example, switching fabric 110 may identify interfaces at which to provide received frames and/or cause electrical coupling between PCIe-compliant interfaces 106 to allow the frames to pass from one PCIe-compliant interface 106 to another. As a non-limiting example, switching fabric 110 may cause one or more electrical switchable couplings of one or more PCIe-compliant interfaces 106 of PCIe domain 104, one to another, to allow frames to pass therebetween.

Fabric link 108 may be a communication path between PCIe domain 104 (e.g., PCIe-compliant interface 106 of PCIe domain 104) and another PCIe-compliant interface 106 of another device. Fabric link 108 may exhibit state 120. State 120 of fabric link 108 may be at least partially responsive to one or more of: a connection type, a data rate, a number of channels, a utilization, and a signal quality. Factor-changing event 122 may affect fabric link 108. Examples of factor-changing events 122 include: high utilization of fabric link 108, disconnection of fabric link 108, a reduction or increase in signal quality of fabric link 108, a reduction of data rate, a reduction of number of channels, and an observation of errors in the transmission of frames.

Link monitor 112 may monitor fabric link 108. As a non-limiting example, link monitor 112 may monitor state 120 of fabric link 108. Additionally or alternatively, link monitor 112 may observe and/or determine one or more factors 116 responsive to one or more factor-changing events 122. Factors 116 may be related to state 120 of fabric link 108. As a non-limiting example, factors 116 may be indicative of state 120 of fabric link 108. As a non-limiting example, factors 116 may be indicative of one or more of: connection type, data rate, number of channels, utilization, and signal quality. Further, in some examples, link monitor 112 may include or perform a weight computation 114 based on one or more factors 116. Weight computation 114 may provide, or update, value 118. Value 118 may be a value (e.g., of a weight) that may be usable in a routing table e.g., to compute routes based on weights of fabric links.

In some examples, a fabric manager (not illustrated in FIG. 1) may update a routing table responsive to value 118 and a shortest path algorithm. The routing table may specify on which of the PCIe-compliant interfaces 106 of PCIe domain 104 to forward a frame according to a destination of the frame. The fabric manager may provide instructions to switching fabric 110 regarding how to manage switching of PCIe domain 104. Thus, switching fabric 110 may manage switching at PCIe domain 104 "physically" (e.g., by making electrical connections) while a fabric manager may manage switching "logically" (e.g., by determining which electrical connections to make and instructed switching fabric 110 accordingly).

Additionally or alternatively, the fabric manager may update the routing table responsive to other values (not illustrated in FIG. 1) received from other devices (e.g., other link monitors of other switches (neither of which is illustrated in FIG. 1)). Link monitor 112 may provide value 118 to the fabric manager and/or link monitor 112 may provide (e.g., broadcast) value 118 to additional switches and/or fabric managers (not illustrated in FIG. 1), e.g., across one or more fabric links.

Figure 2:
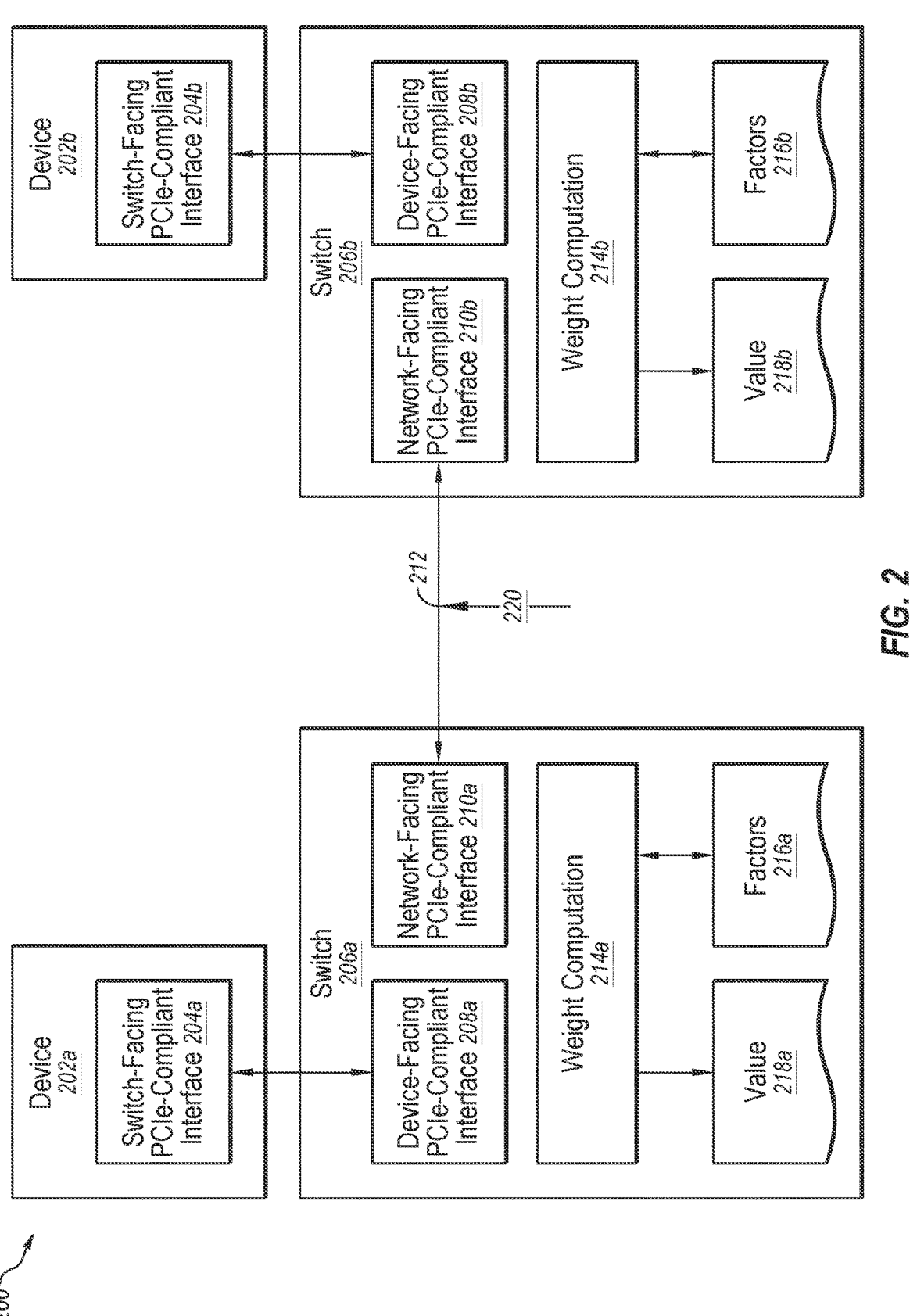
FIG. 2 is a functional block diagram illustrating a system according to one or more examples.

FIG. 2 is a functional block diagram illustrating an example system 200 according to one or more examples. As a non-limiting example, system 200 includes a switch 206a and a switch 206b each to monitor a fabric link 212 so that routes may be updated responsive to a factor-changing event 220 at fabric link 212.

As a non-limiting example, system 200 includes a device 202a (which device 202a includes a switch-facing PCIe-compliant interface 204a) and a device 202b (which device 202b includes a switch-facing PCIe-compliant interface 204b). Further, switch 206a includes a device-facing PCIe-compliant interface 208a communicatively coupled to switch-facing PCIe-compliant interface 204a and a network-facing PCIe-compliant interface 210a, and switch 206b includes a device-facing PCIe-compliant interface 208b communicatively coupled to switch-facing PCIe-compliant interface 204b and a network-facing PCIe-compliant interface 210b communicatively coupled to network-facing PCIe-compliant interface 210a by fabric link 212.

Either or both of switch 206a and switch 206b may observe factor-changing event 220 of a state of fabric link 212 between switch 206a and switch 206b. Further, switch 206a may obtain a value 218a at least partially responsive to a weight computation 214a for one or more factors 216a, one or more factors 216a associated with factor-changing event 220. Switch 206b may obtain a value 218b at least partially responsive to a weight computation 214b for one or more factors 216b, one or more factors 216b associated with factor-changing event 220.

Each of switch 206a and switch 206b may be an example of switch 102 of FIG. 1. Further, each of weight computation 214a and weight computation 214b may be an example of weight computation 114 of FIG. 1, each of factors 216a and factors 216b may be an example of factor 116 of FIG. 1, and each of value 218a and value 218b may be an example of value 118 of FIG. 1. Each of network-facing PCIe-compliant interface 210a, network-facing PCIe-compliant interface 210b, device-facing PCIe-compliant interface 208a, and device-facing PCIe-compliant interface 208b may be an example of PCIe-compliant interface 106 of FIG. 1. Fabric link 212 may be an example of fabric link 108 of FIG. 1. Factor-changing event 220 may be an example of factor-changing event 122 of FIG. 1.

Device 202a and/or device 202b may be any suitable device with a PCIe-compliant interface. Non-limiting examples of suitable devices include GPUs, data processing units (DPUs), FPGAs, NVMes, network interface cards (NICs), and hosts (including main CPUs). Device 202a may communicate with device 202b via switch-facing PCIe-compliant interface 204*a*, switch 206*a*, fabric link 212, switch 206*b*, and switch-facing PCIe-compliant interface 204*b*.

Each of switch 206*a* and switch 206*b* may provide value 218*a* and value 218*b* respectively for a routing table to be updated.

As a non-limiting example, each of switch 206*a* and switch 206*b* may include a respective fabric manager (not illustrated in FIG. 2) or be directly and exclusively communicatively coupled to a fabric manager (also not illustrated in FIG. 2). Each of switch 206*a* and switch 206*b* may provide value 218*a* and value 218*b*, respectively, to the respective fabric manager of switch 206*a* and switch 206*b*. The respective fabric managers may then update routes in their respective routing tables and provide updated routes to respective switching fabrics of switch 206*a* and switch 206*b*.

Additionally or alternatively, each of switch 206*a* and switch 206*b* may provide (e.g., broadcast) value 218*a* and value 218*b* respectively to a single fabric manager (not illustrated in FIG. 2) external to both of switch 206*a* and switch 206*b*. The single fabric manager may update the routing table and provide updated routes to switch 206*a* and switch 206*b*.

Additionally or alternatively, each of switch 206*a* and switch 206*b* may provide (e.g., broadcast) value 218*a* and value 218*b*, respectively, to other switches so the respective fabric managers of the other switches may update respective routing tables.

Figure 3:
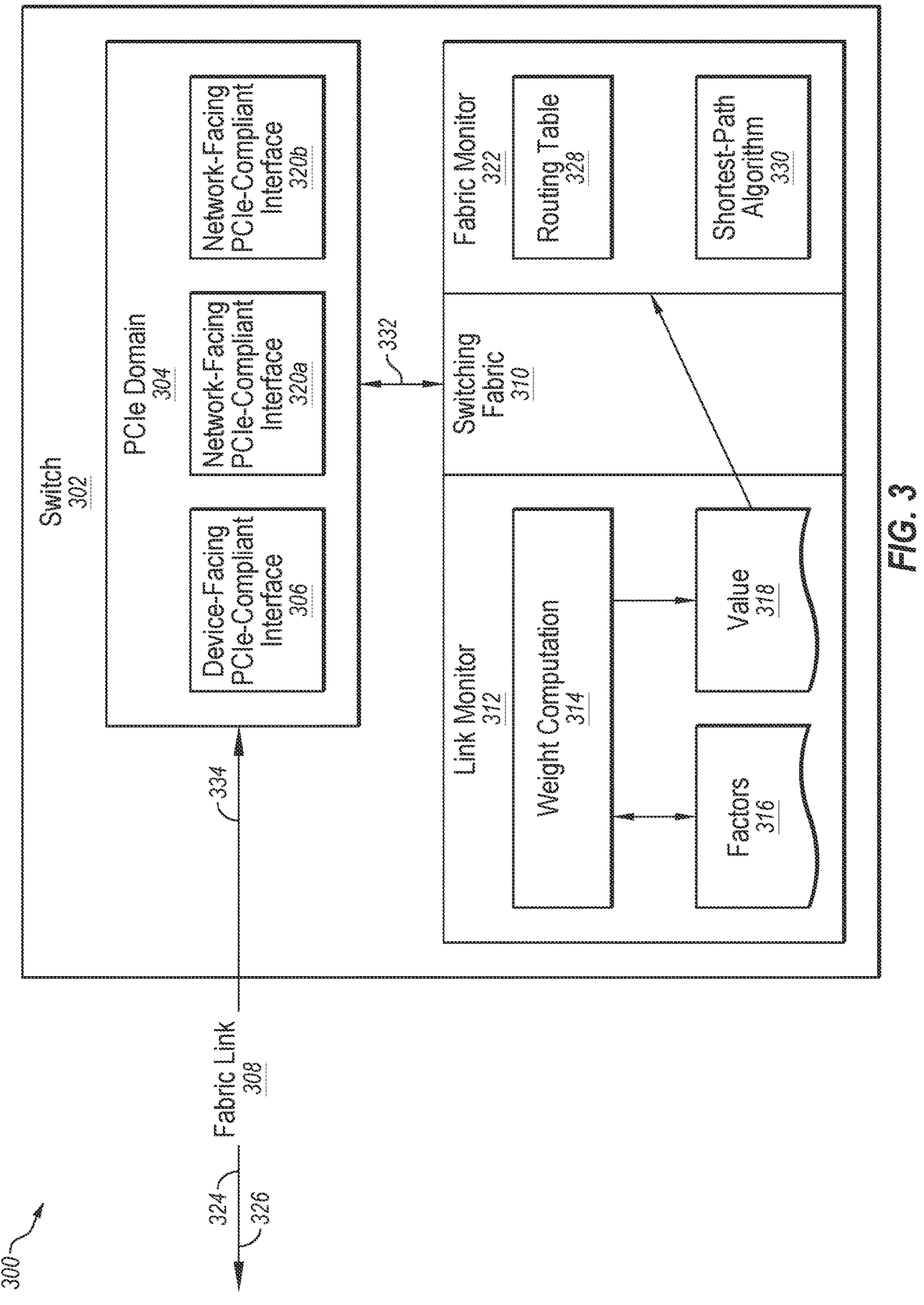
FIG. 3 is a functional block diagram illustrating another apparatus according to one or more examples.

FIG. 3 is a functional block diagram illustrating an example apparatus 300 according to one or more examples. As a non-limiting example, apparatus 300 includes a switch 302, which switch 302 includes a PCIe domain 304, a link monitor 312 to monitor a fabric link 308, a switching fabric 310, and a fabric manager 322 to update routes responsive to a factor-changing event.

Switch 302 may be an example of switch 102 of FIG. 1. PCIe domain 304 may be an example of PCIe domain 104 of FIG. 1 and may comprise device-facing PCIe-compliant interface 306, network-facing PCIe-compliant interface 320*a* and network-facing PCIe-compliant interface 320*b*. Device-facing PCIe-compliant interface 306 may be an example of PCIe-compliant interface 106 of FIG. 1. Additionally, network-facing PCIe-compliant interface 320*a* and network-facing PCIe-compliant interface 320*b* may be additional examples of PCIe-compliant interfaces described but not illustrated with regard to PCIe domain 104 of FIG. 1. Fabric link 308 may be an example of fabric link 108 of FIG. 1. Fabric link 308 may be PCIe-compliant; further fabric link 308 may be CXL-compliant, e.g., fabric link 308 may be a CXL-compliant link 334. Each of device-facing PCIe-compliant interface 306, network-facing PCIe-compliant interface 320*a* and network-facing PCIe-compliant interface 320*b* may have a respective fabric link although only one is illustrated in FIG. 3.

Switching fabric 310 may be an example of switching fabric 110 of FIG. 1. Link monitor 312 may be an example of link monitor 112 of FIG. 1. Weight computation 314 may be an example of weight computation 114 of FIG. 1. One or more factors 316 may be an example of one or more factors 116 of FIG. 1. Value 318 may be an example of value 118 of FIG. 1. State 324 may be an example of state 120 of FIG. 1. State 324 may be at least partially responsive to one or more of: connection type, data rate, number of channels, utilization, and signal quality 326.

Fabric manager 322 comprises, and may update, a routing table 328 based on value 318 and a shortest-path algorithm 330. Additionally or alternatively, fabric manager 322 may update routing table 328 based on one or more received values 332 e.g., received at fabric link 308 e.g., having been broadcast by another link monitor of another switch (not illustrated in FIG. 3). Switch 302 may provide (e.g., broadcast) value 318 (e.g., at one or more of its fabric links, e.g., fabric link 308) to other switches (not illustrated in FIG. 3) so that the other switches can update their routing tables accordingly.

Switching fabric 310 may manage switching at PCIe domain 304 according to routing table 328.

As an example of operations of apparatus 300, switch 302 may be part of a network of devices e.g., using respective PCIe-compliant interfaces and respective fabric links. Link monitor 312 may monitor states of its fabric links (including e.g., fabric link 308). If link monitor 312 observes a change in state 324 of a fabric link, e.g., if there is a change affecting one or more of: connection type, data rate, number of channels, utilization, and signal quality 326, link monitor 312 may update value 318 according to weight computation 314 e.g., based on factors 316. Link monitor 312 may provide value 318 to fabric manager 322. Fabric manager 322 may update routing table 328 according to value 318 and shortest-path algorithm 330. Switching fabric 310 may then manage switching at PCIe domain 304 according to routing table 328. Additionally or alternatively, switch 302 may provide (e.g., broadcast) value 318 (e.g., at one or more of its fabric links) so that other switches can update their respective routing tables accordingly.

Continuing the example of operations, switch 302 may receive received value 332 (e.g., at fabric link 308) and may update routing table 328 according to received value 332 and shortest-path algorithm 330. Switching fabric 310 may then manage switching at PCIe domain 304 according to routing table 328.

Figure 4:
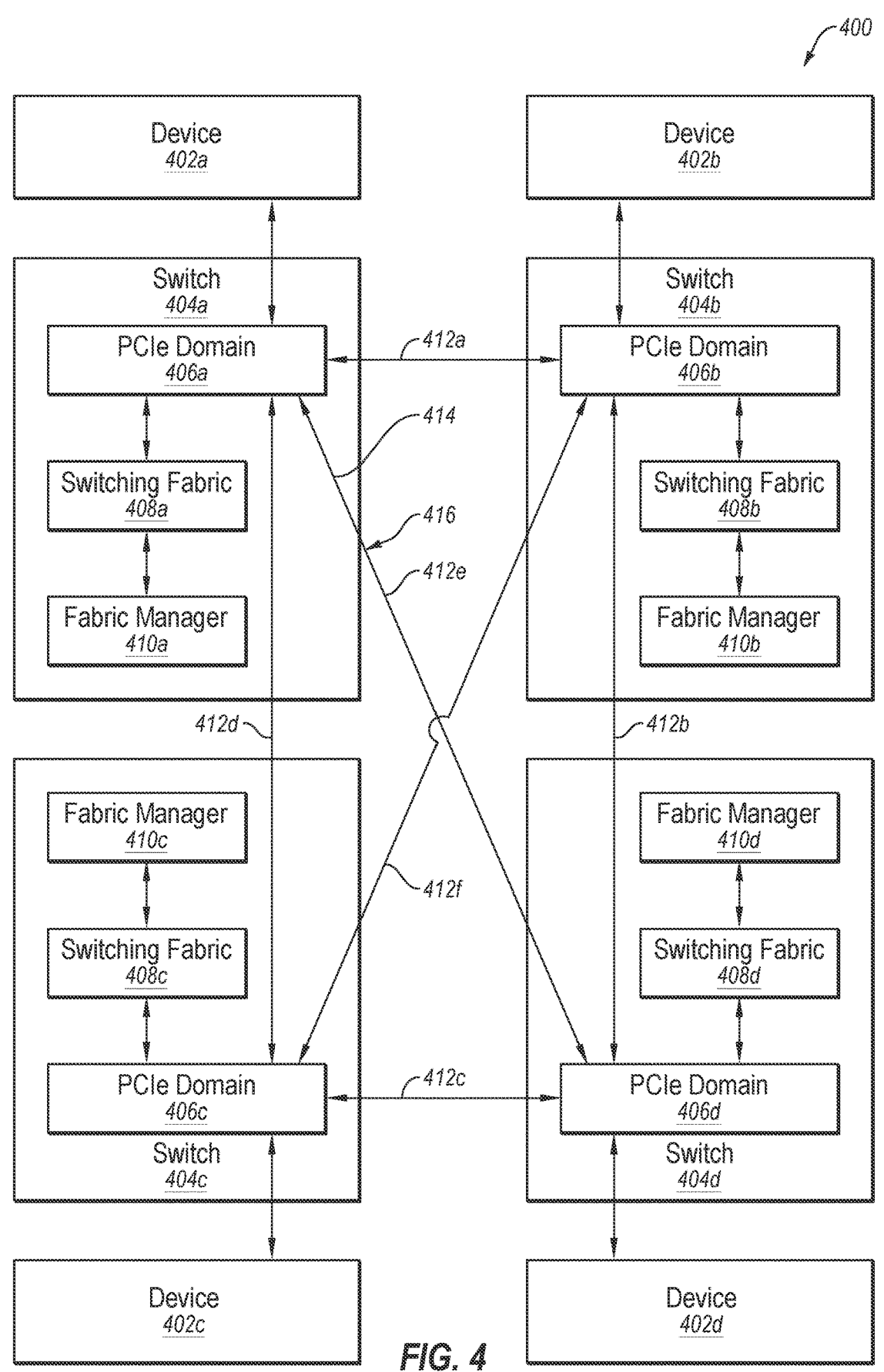
FIG. 4 is a functional block diagram illustrating another system according to one or more examples.

FIG. 4 is a functional block diagram illustrating an example system 400 according to one or more examples. As a non-limiting example, system 400 includes four switches 404 (switch 404*a*, switch 404*b*, switch 404*c*, switch 404*d*, which may be referred to collectively as "switches 404"). Any or all of switches 404 may update routes responsive to factor-changing events at fabric links. In FIG. 4, four switches 404 are illustrated for descriptive purposes. In other example, any number of switches may be included.

Each of switches 404 may be an example of switch 102 of FIG. 1, switch 206*a* of FIG. 2, switch 206*b* of FIG. 2, and/or switch 302 of FIG. 3. As a non-limiting example, each of switches 404 may include a respective PCIe domain 406 (i.e., switch 404*a* may include PCIe domain 406*a*, switch 404*b* may include PCIe domain 406*b*, switch 404*c* may include PCIe domain 406*c*, and switch 404*d* may include PCIe domain 406*d*). PCIe domain 406*a*, PCIe domain 406*b*, PCIe domain 406*c* and PCIe domain 406*d* may be referred to collectively as PCIe domains 406. Each of PCIe domains 406 may be an example of PCIe domain 104 of FIG. 1.

Further, each of switches 404 includes a respective switching fabric 408 (i.e., switch 404*a* includes switching fabric 408*a*, switch 404*b* includes switching fabric 408*b*, switch 404*c* includes switching fabric 408*c*, and switch 404*d* includes switching fabric 408*d*). Switching fabric 408*a*, switching fabric 408*b*, switching fabric 408*c*, and switching fabric 408*d*, may be referred to collectively as switching fabrics 408. Each of switching fabrics 408 may be an example of switching fabric 110 of FIG. 1.

Each of switches 404 may be communicatively coupled to a respective device 402 (i.e., switch 404*a* is communicatively coupled to device 402*a*, switch 404*b* is communicatively coupled to device 402*b*, switch 404*c* is communicatively coupled to device 402*c*, and switch 404*d* is communicatively coupled to device 402*d*). Device 402*a*, device 402*b*, device 402*c*, and device 402*d* may be referred to collectively as devices 402. Each of devices 402 may be an example of device 202*a* or device 202*b* of FIG. 2. In FIG. 4, one device 402 is illustrated communicatively coupled to each of switches 404 for descriptive purposes. In other example, any number of devices may be communicatively coupled to each of switches 404.

Each of switches 404 is communicatively coupled to each of the others via fabric links 412 (i.e., switch 404*a* is communicatively coupled to switch 404*b* via fabric link 412*a*, switch 404*b* is communicatively coupled to switch 404*d* via fabric link 412*b*, switch 404*d* is communicatively coupled to switch 404*c* via fabric link 412*c*, switch 404*c* is communicatively coupled to switch 404*a* via fabric link 412*d*, switch 404*a* is communicatively coupled to switch 404*d* via fabric link 412*e*, and switch 404*b* is communicatively coupled to switch 404*c* via fabric link 412*f*). Fabric link 412*a*, fabric link 412*b*, fabric link 412*c*, fabric link 412*d*, fabric link 412*e*, and fabric link 412*f* may be referred to collectively as fabric links 412. Fabric links 412 are examples of fabric link 108 of FIG. 1. Each of fabric links 412 may exhibit a respective state.

Each of switches 404 includes a respective fabric manager 410 (i.e., switch 404*a* includes fabric manager 410*a*, switch 404*b* includes fabric manager 410*b*, switch 404*c* includes fabric manager 410*c*, and switch 404*d* includes fabric manager 410*d*). Fabric manager 410*a*, fabric manager 410*b*, fabric manager 410*c*, and fabric manager 410*d* may be referred to collectively as "fabric managers 410." Each of fabric managers 410 may be an example of fabric manager 322 of FIG. 3.

Each of switches 404 may include a link monitor (not illustrated in FIG. 4) that may monitor states of each of its links. As a non-limiting example, a link monitor of switch 404*a* may monitor the state of fabric link 412*a*, fabric link 412*d*, and fabric link 412*e*. The link monitors of switches 404 may generate values representative of states of their respective fabric links. Fabric managers 410 may update respective routing tables responsive to the respective values.

Fabric managers 410 may update routes (in their respective routing tables (not illustrated in FIG. 4)) between switches 404 responsive to one or more factor-changing events. Each of switches 404 may determine how to route communications according to the routes of each of respective their routing tables of their respective fabric managers 410.

Although in FIG. 4, fabric managers 410 are illustrated within switches 404, in other examples, fabric managers 410 may be external to and communicatively coupled to switches 404. As a non-limiting example, fabric manager 410*a* may be external to switch 404*a* and may be communicatively coupled to switch 404*a*. In some examples, an external fabric manager 410 may be exclusively communicatively coupled to one switch 404.

As an example of operations of system 400, switch 404*a* may be routing communications (e.g., frames 414) to switch 404*d* via fabric link 412*e*. Fabric link 412*e* may experience a factor-changing event. As a non-limiting example, fabric link 412*e* may exhibit delay as a result of a volume of communications being carried by fabric link 412*e*, fabric link 412*e* may experience a decrease in data rate, or fabric link 412*e* may be disrupted. A link monitor of switch 404*a* may observe the factor-changing event. The link monitor of switch 404*a* may generate a value 416 indicative of the state of fabric link 412*e*. Fabric manager 410*a* may update a routing table according to value 416 and a shortest-path algorithm. The routing table may include fields for one or more of: connection type, data rate, number of channels, utilization, and signal quality of each of fabric links 412. Fabric manager 410*a* may determine that the shortest (or best with respect to network connectivity) path between switch 404*a* and switch 404*d* is through switch 404*c*. Fabric manager 410*a* may instruct switching fabric 408*a* to route communications for switch 404*d*, or devices directly connected to switch 404*d* (e.g., device 402*d*), through switch 404*c*. Switching fabric 408*a* may thereafter route communications for switch 404*d*, or devices directly connected to switch 404*d*, through a PCIe-compliant interface of PCIe domain 406*a* communicatively coupled to a PCIe-compliant interface of PCIe domain 406*c* of switch 404*c*.

Additionally or alternatively, switch 404*a* may provide value 416 to switch 404*b* and switch 404*c* (e.g., via fabric link 412*a* and fabric link 412*d* respectively). Switch 404*b* and switch 404*c* may update their respective routing tables accordingly.

Figure 5:
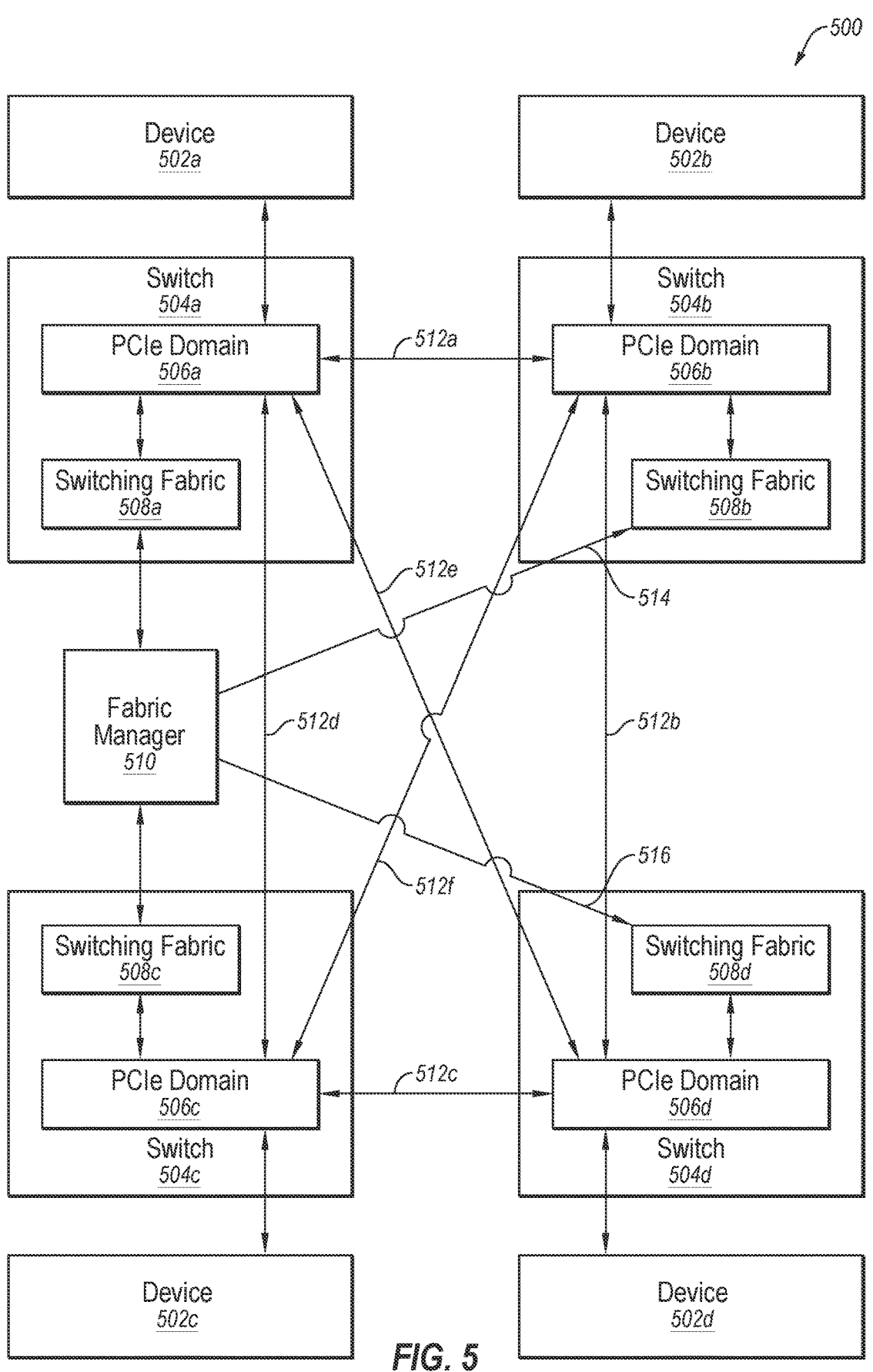
FIG. 5 is a functional block diagram illustrating yet another system according to one or more examples.

FIG. 5 is a functional block diagram illustrating an example system 500 according to one or more examples. As a non-limiting example, system 500 includes four switches 504 (switch 504*a*, switch 504*b*, switch 504*c*, switch 504*d*, which may be referred to collectively as "switches 504"). Switching within each of switches 504 may be managed by fabric manager 510. Fabric manager 510 may manage switching responsive to link changing events at any of the respective fabric links 512 between any of the switches 504. In FIG. 5, four switches 504 are illustrated for descriptive purposes. In other examples, any number of switches may be included.

Each of switches 504 may be an example of switch 102 of FIG. 1. As a non-limiting example, each of switches 504 may include a respective PCIe domain 506 (i.e., switch 504*a* may include PCIe domain 506*a*, switch 504*b* may include PCIe domain 506*b*, switch 504*c* may include PCIe domain 506*c*, and switch 504*d* may include PCIe domain 506*d*). PCIe domain 506*a*, PCIe domain 506*b*, PCIe domain 506*c* and PCIe domain 506*d* may be referred to collectively as PCIe domains 506. Each of PCIe domains 506 may be an example of PCIe domain 104 of FIG. 1.

Further, each of switches 504 includes a respective switching fabric 508 (i.e., switch 504*a* includes switching fabric 508*a*, switch 504*b* includes switching fabric 508*b*, switch 504*c* includes switching fabric 508*c*, and switch 504*d* includes switching fabric 508*d*). Switching fabric 508*a*, switching fabric 508*b*, switching fabric 508*c*, and switching fabric 508*d*, may be referred to collectively as switching fabrics 508. Each of switching fabrics 508 may be an example of switching fabric 110 of FIG. 1.

Each of switches 504 may be communicatively coupled to a respective device 502 (i.e., switch 504*a* is communicatively coupled to device 502*a*, switch 504*b* is communicatively coupled to device 502*b*, switch 504*c* is communicatively coupled to device 502*c*, and switch 504*d* is communicatively coupled to device 502*d*). Device 502*a*, device 502*b*, device 502*c*, and device 502*d* may be referred to collectively as devices 502. Each of devices 502 may be an example of device 202*a* or device 202*b* of FIG. 2. In FIG. 5, one device 502 is illustrated communicatively coupled to each of switches 504 for descriptive purposes. In other example, any number of devices may be communicatively coupled to each of switches 504.

Each of switches 504 is communicatively coupled to each of the others via respective fabric links 512 (i.e., switch 504*a* is communicatively coupled to switch 504*b* via fabric link 512*a*, switch 504*b* is communicatively coupled to switch 504*d* via fabric link 512*b*, switch 504*d* is communicatively coupled to switch 504*c* via fabric link 512*c*, switch 504*c* is communicatively coupled to switch 504*a* via fabric link 512*d*, switch 504*a* is communicatively coupled to switch 504*d* via fabric link 512*e*, and switch 504*b* is communicatively coupled to switch 504*c* via fabric link 512*0*. Fabric link 512*a*, fabric link 512*b*, fabric link 512*c*, fabric link 512*d*, fabric link 512*e*, and fabric link 512*f* may be referred to collectively as fabric links 512. Each of fabric links 512 may be an example of fabric link 108 of FIG. 1. Each of fabric links 512 may exhibit a respective state.

Each of switches 504 may include a link monitor (not illustrated in FIG. 5) that may monitor states of each of its links. As a non-limiting example, a link monitor of switch 504*a* may monitor the state of fabric link 512*a*, fabric link 512*d*, and fabric link 512*e*. The link monitors of switches 504 may generate values representative of states of their respective fabric links. Switches 504 may provide the respective values to fabric manager 510.

Fabric manager 510 may update a routing table (not illustrated in FIG. 5) including routes between switches 504 responsive to received values, e.g., responsive to the received values indicative of one or more factor-changing events. Fabric manager 510 may provide routes to each of switches 504 and each of switches 504 may route frames according to the routes provided by fabric managers 510.

As an example of operations of system 500, switch 504*b* may be routing communications to switch 504*d* via fabric link 512*b*. Fabric link 512*b* may experience a factor-changing event. As a non-limiting example, fabric link 512*b* may exhibit delay as a result of a volume of communications being carried by fabric link 512*b*, fabric link 512*b* may experience a decrease in data rate, or fabric link 512*b* may disrupted. A link monitor of switch 504*d* may observe the factor-changing event. The link monitor of switch 504*d* may generate one or more values 516 indicative of the state of fabric link 512*b* and provide one or more values 516 to fabric manager 510. (Additionally, others of switches 504 may send one or more values to fabric manager 510 indicative of the factor-changing event relative to fabric link 512*b*.) Fabric manager 510 may update a routing table according to one or more values 516 and a shortest-path algorithm. The routing table may take into account one or more of: connection type, data rate, number of channels, utilization, and signal quality of each of fabric links 512. Fabric manager 510 may determine that the shortest (or best with respect to network connectivity) path between switch 504*b* and switch 504*d* is through switch 504*c*. Fabric manager 510 may instruct switching fabric switch 504*b* to route communications for switch 504*d*, or devices directly connected to switch 504*d*, through switch 504*c*. As a non-limiting example, fabric manager 510 may send routes 514 to switching fabric 508*b* of switch 504*b*. (Additionally, fabric manager 510 may send routes to others of switches 504.) Switching fabric 508*b* may thereafter route communications for switch 504*d*, or for devices directly connected to switch 504*d*, through a PCIe-compliant interface of PCIe domain 506*c* communicatively coupled to a PCIe-compliant interface of PCIe domain 506*d* of switch 504*c*.

Figure 6A:
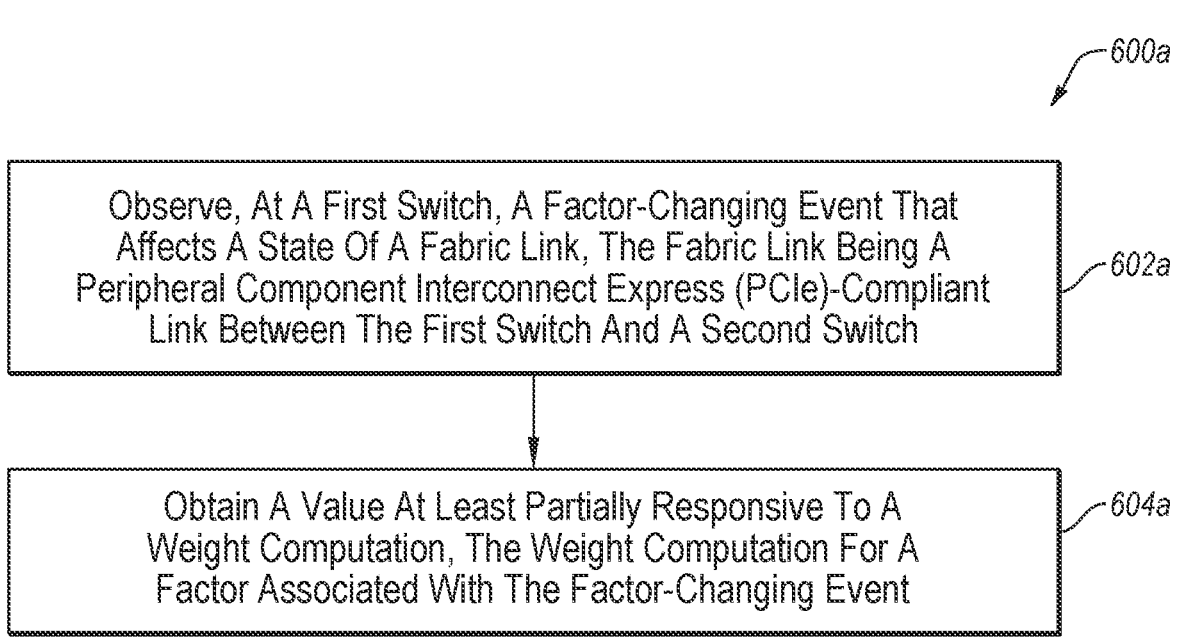
FIG. 6A is a functional block diagram illustrating a method according to one or more examples.

FIG. 6A is a flowchart of an example method 600*a*, in accordance with various examples. At least a portion of method 600*a* may be performed, in some examples, by a device or system, such as apparatus 100 of FIG. 1, switch 102 of FIG. 1, link monitor 112 of FIG. 1, switch 206*a* of FIG. 2, switch 206*b* of FIG. 2, apparatus 300 of FIG. 3, switch 302 of FIG. 3, link monitor 312 of FIG. 3, fabric manager 322 of FIG. 3, any or all of switches 404 of FIG. 4, any or all of fabric managers 410 of FIG. 4, any or all of switches 504 of FIG. 5, fabric manager 510 of FIG. 5, or another device or system. Although illustrated as discrete blocks, various blocks may be divided into additional blocks, combined into fewer blocks, or eliminated, depending on the desired implementation.

At operation 602*a*, a factor-changing event that affects a state of a fabric link may be observed at a first switch. The fabric link may be a Peripheral Component Interconnect Express (PCIe)-compliant link between the first switch and a second switch. Factor-changing event 122 of FIG. 1 may be an example of a factor-changing event observed at operation 602*a*. State 120 of FIG. 1 may be an example of the state of the fabric link observed at operation 602*a*. Fabric link 108 of FIG. 1 may be an example of the fabric link at which the factor-changing event is observed at operation 602*a*. Switch 102 of FIG. 1 or switch 206*a* of FIG. 2 may be an example of the first switch of operation 602*a*. Switch 206*b* of FIG. 2 may be an example of the second switch of operation 602*a*.

At operation 604*a*, a value may be obtained at least partially responsive to a weight computation. The weight computation may be for a factor associated with the factor-changing event. Value 118 of FIG. 1 may be an example of the value obtained at operation 604*a*. Weight computation 114 of FIG. 1 may be an example of the weight computation of operation 604*a*. Factor 116 of FIG. 1 may be an example of the factor of FIG. 1.

Figure 6B:
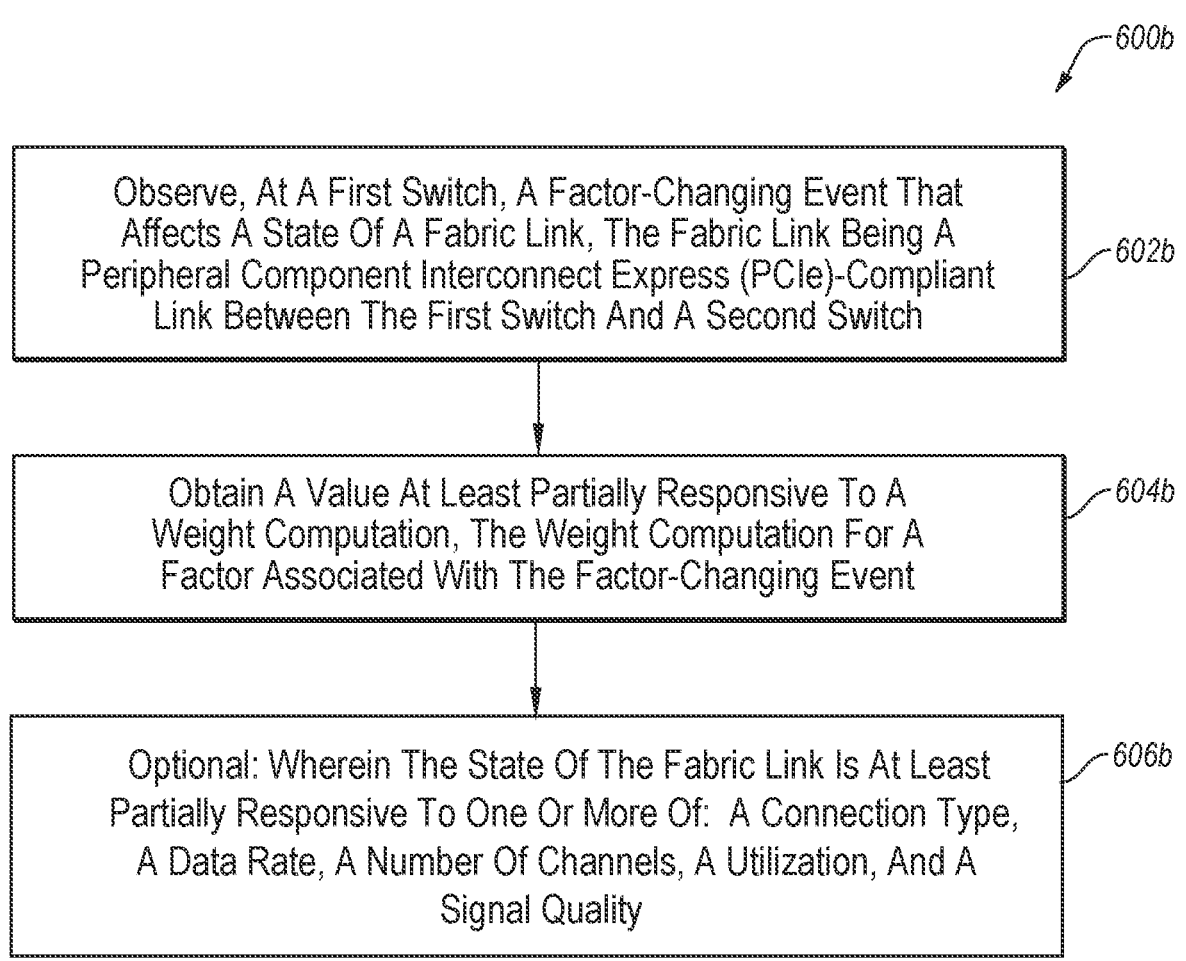
FIG. 6B is a functional block diagram illustrating another method according to one or more examples.

FIG. 6B is a flowchart of an example method 600*b*, in accordance with various examples. At least a portion of method 600*b* may be performed, in some examples, by a device or system, such as apparatus 100 of FIG. 1, switch 102 of FIG. 1, link monitor 112 of FIG. 1, switch 206*a* of FIG. 2, switch 206*b* of FIG. 2, apparatus 300 of FIG. 3, switch 302 of FIG. 3, link monitor 312 of FIG. 3, fabric manager 322 of FIG. 3, any or all of switches 404 of FIG. 4, any or all of fabric managers 410 of FIG. 4, any or all of switches 504 of FIG. 5, fabric manager 510 of FIG. 5, or another device or system. Although illustrated as discrete blocks, various blocks may be divided into additional blocks, combined into fewer blocks, or eliminated, depending on the desired implementation.

Operation 602*b* may be the same as operation 602*a* of FIG. 6A. Operation 604*b* may be the same as operation 604*a* of FIG. 6A.

According to operation 606*b*, the state of the fabric link (e.g., the state affected by the factor-changing event) may be at least partially responsive to one or more of: a connection type, a data rate, a number of channels, a utilization, and a signal quality.

Figure 7:
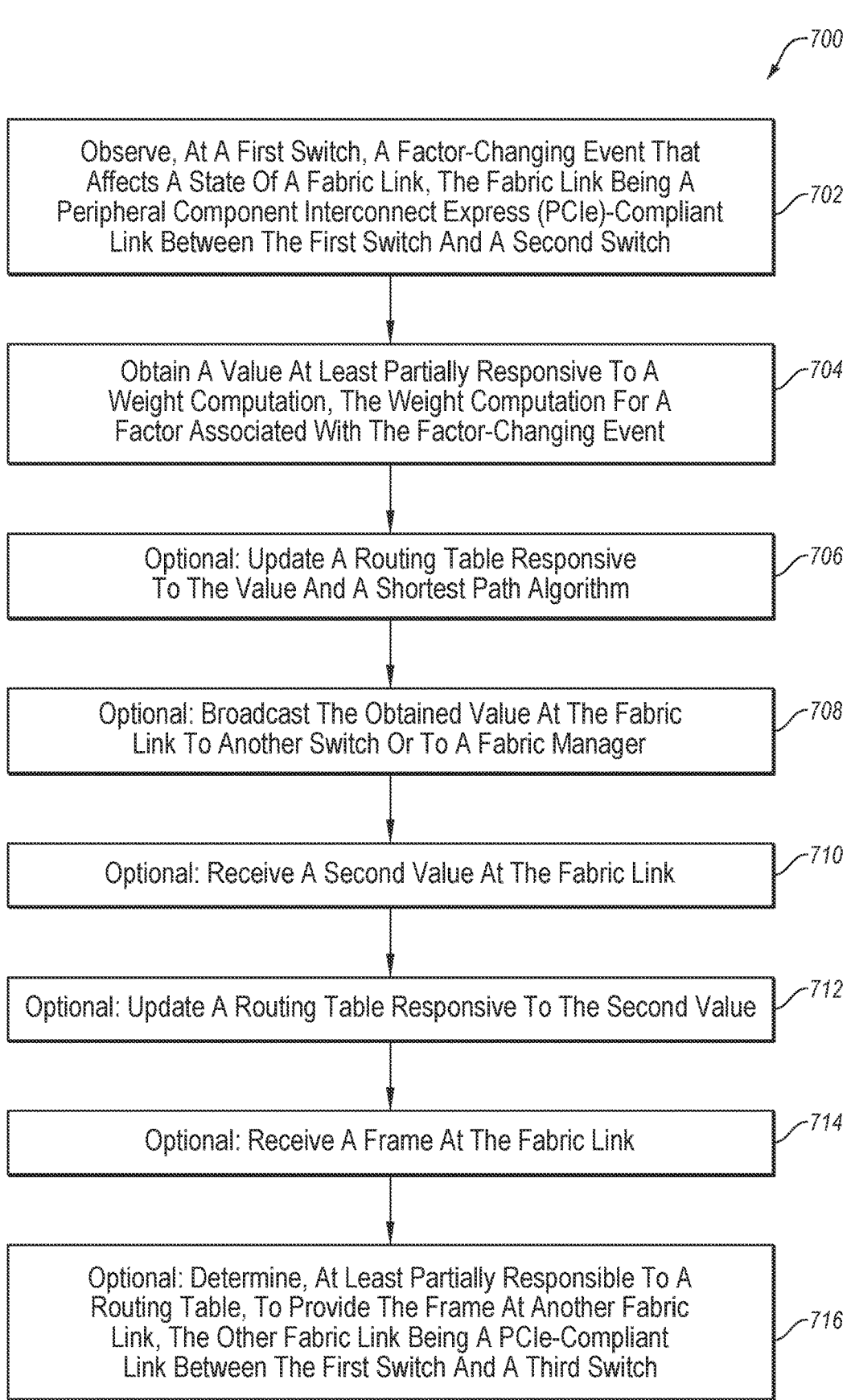
FIG. 7 is a functional block diagram illustrating another method according to one or more examples.

FIG. 7 is a flowchart of an example method 700, in accordance with various examples. At least a portion of method 700 may be performed, in some examples, by a device or system, such as apparatus 100 of FIG. 1, switch 102 of FIG. 1, link monitor 112 of FIG. 1, switch 206*a* of FIG. 2, switch 206*b* of FIG. 2, apparatus 300 of FIG. 3, switch 302 of FIG. 3, link monitor 312 of FIG. 3, fabric manager 322 of FIG. 3, any or all of switches 404 of FIG. 4, any or all of fabric managers 410 of FIG. 4, any or all of switches 504 of FIG. 5, fabric manager 510 of FIG. 5, or another device or system. Although illustrated as discrete blocks, various blocks may be divided into additional blocks, combined into fewer blocks, or eliminated, depending on the desired implementation.

Operation 702 may be the same as operation 602a of FIG. 6A. Operation 704 may be the same as operation 604a of FIG. 6A.

At operation 706, which is optional, a routing table may be updated responsive to the value and a shortest path algorithm. As a non-limiting example, fabric manager 322 of FIG. 3 may update routing table 328 of FIG. 3 responsive to value 318 of FIG. 3 or received value 332 of FIG. 3 and responsive to shortest-path algorithm 330 of FIG. 3. As another non-limiting example, fabric manager 510 of FIG. 5 may update an internal routing table (not illustrated in FIG. 5) responsive to a value (e.g., received from one of switches 504) and a shortest path algorithm.

At operation 708, which is optional, the obtained value may be broadcast at the fabric link to another switch or to a fabric manager. As a non-limiting example, received value 332 of FIG. 3 is an example of a value that was broadcast at a fabric link to another switch or fabric manager (i.e., from a switch or fabric manager not illustrated in FIG. 3 to switch 302 of FIG. 3). As a non-limiting example, returning to the example described with regard to the operation of system 400 of FIG. 4, switch 404a may broadcast value 416 and, as a result, value 416 may be provided to switch 404c.

At operation 710, which is optional, a second value may be received at the fabric link. Received value 332 of FIG. 3 is an example of a value received at the fabric link.

At operation 712, which is optional, a routing table may be updated responsive to the second value (e.g., the second value of operation 710). As a non-limiting example, returning to the example described with regard to the operation of system 400 of FIG. 4, fabric manager 410c of switch 404c may receive the second value (e.g., provided by switch 404a) and may update an internal routing table based on value 416.

At operation 714, which is optional, a frame may be received at the fabric link.

At operation 716, which is optional, it may be determined, at least partially responsible to a routing table, to provide the frame (e.g., the frame received at operation 714) at another fabric link, the other fabric link being a PCIe-compliant link between the first switch and a third switch.

Modifications, additions, or omissions may be made to method 600 and/or method 700 without departing from the scope of the present disclosure. For example, the operations of method 600 and/or method 700 may be implemented in differing order. Furthermore, the outlined operations and actions are only provided as examples, and some of the operations and actions may be optional, combined into fewer operations and actions, or expanded into additional operations and actions without detracting from the essence of the disclosed example.

Figure 8:
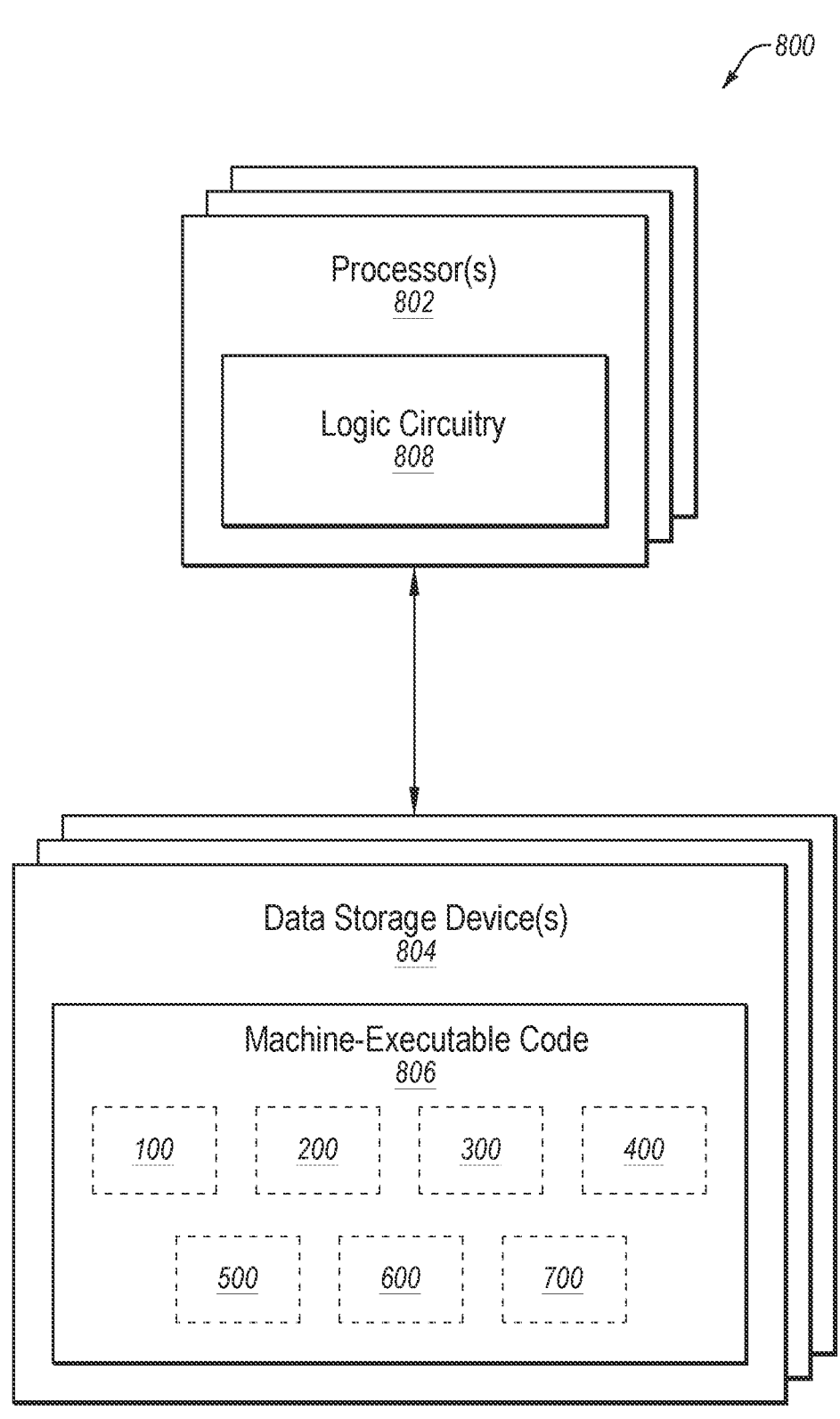
FIG. 8 is a block diagram of an example device that, in various examples, may be used to implement various functions, operations, acts, processes, and/or methods of one or more examples disclosed herein.

FIG. 8 is a block diagram of an example device 800 that, in various examples, may be used to implement various functions, operations, acts, processes, and/or methods of one or more examples disclosed herein. Device 800 includes one or more processors 802 (sometimes referred to herein as "processors 802") operably coupled to one or more apparatuses such as data storage devices (sometimes referred to herein as "storage 804"), without limitation. Storage 804 includes machine-executable code 806 stored thereon (e.g., stored on a computer-readable memory) and processors 802 include logic circuitry 808. Machine-executable code 806 include information describing functional elements that may be implemented by (e.g., performed by) logic circuitry 808. Logic circuitry 808 is adapted to implement (e.g., perform) the functional elements described by machine-executable code 806. Device 800, when executing the functional elements described by machine-executable code 806, should be considered as special purpose hardware for carrying out the functional elements disclosed herein. In various examples, processors 802 may perform the functional elements described by machine-executable code 806 sequentially, concurrently (e.g., on one or more different hardware platforms), or in one or more parallel process streams.

When implemented by logic circuitry 808 of processors 802, machine-executable code 806 may adapt processors 802 to perform operations of examples disclosed herein. For example, machine-executable code 806 may adapt processors 802 to perform at least a portion or a totality of method 600a of FIG. 6A, method 600b of FIG. 6B, and/or method 700 of FIG. 7. As another example, machine-executable code 806 may adapt processors 802 to perform at least a portion or a totality of the operations discussed for apparatus 100 of FIG. 1, switch 102 of FIG. 1, link monitor 112 of FIG. 1, switch 206a of FIG. 2, switch 206b of FIG. 2, apparatus 300 of FIG. 3, switch 302 of FIG. 3, link monitor 312 of FIG. 3, fabric manager 322 of FIG. 3, any or all of switches 404 of FIG. 4, any or all of fabric managers 410 of FIG. 4, any or all of switches 504 of FIG. 5, and/or fabric manager 510 of FIG. 5.

Processors 802 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer executes computing instructions (e.g., software code) related to examples of the present disclosure. It is noted that a general-purpose processor (may also be referred to herein as a host processor or simply a host) may be a microprocessor, but in the alternative, processors 802 may include any conventional processor, controller, microcontroller, or state machine. Processors 802 may also be implemented as a combination of computing devices, such as a combination of a DSP and a microprocessor, a plurality of microprocessors, one or more microprocessors in conjunction with a DSP core, or any other such configuration.

In various examples, storage 804 includes volatile data storage (e.g., random-access memory (RAM)), non-volatile data storage (e.g., Flash memory, a hard disc drive, a solid state drive, erasable programmable read-only memory (EPROM), without limitation). In various examples, processors 802 and storage 804 may be implemented into a single device (e.g., a semiconductor device product, a system on chip (SOC), without limitation). In various examples, processors 802 and storage 804 may be implemented into separate devices.

In various examples, machine-executable code 806 may include computer-readable instructions (e.g., software code, firmware code). By way of non-limiting example, the computer-readable instructions may be stored by storage 804, accessed directly by processors 802, and executed by processors 802 using at least logic circuitry 808. Also by way of non-limiting example, the computer-readable instructions may be stored on storage 804, transmitted to a memory device (not shown) for execution, and executed by processors 802 using at least logic circuitry 808. Accordingly, in various examples, logic circuitry 808 includes electrically configurable logic circuitry.

In various examples, machine-executable code 806 may describe hardware (e.g., circuitry) to be implemented in logic circuitry 808 to perform the functional elements. This hardware may be described at any of a variety of levels of abstraction, from low-level transistor layouts to high-level description languages. At a high-level of abstraction, a hardware description language (HDL) such as an Institute of Electrical and Electronics Engineers (IEEE) Standard hardware description language (HDL) may be used, without limitation. By way of non-limiting examples, Verilog™, SystemVerilog™ or very large scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of logic circuitry 808 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in various examples, machine-executable code 806 may include an HDL, an RTL, a GL description, a mask level description, other hardware description, or any combination thereof.

In examples where machine-executable code 806 includes a hardware description (at any level of abstraction), a system (not shown, but including storage 804) may implement the hardware description described by machine-executable code 806. By way of non-limiting example, processors 802 may include a programmable logic device (e.g., an FPGA or a PLC) and the logic circuitry 808 may be electrically controlled to implement circuitry corresponding to the hardware description into logic circuitry 808. Also by way of non-limiting example, logic circuitry 808 may include hardwired logic manufactured by a manufacturing system (not shown, but including storage 804) according to the hardware description of machine-executable code 806.

Regardless of whether machine-executable code 806 includes computer-readable instructions or a hardware description, logic circuitry 808 is adapted to perform the functional elements described by machine-executable code 806 when implementing the functional elements of machine-executable code 806. It is noted that although a hardware description may not directly describe functional elements, a hardware description indirectly describes functional elements that the hardware elements described by the hardware description are capable of performing.

As used in the present disclosure, the terms "module" or "component" may refer to specific hardware implementations to perform the actions of the module or component and/or software objects or software routines that may be stored on and/or executed by general purpose hardware (e.g., computer-readable media, processing devices, without limitation) of the computing system. In various examples, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different sub-combinations of some of the elements. For example, the phrase "A, B, C, D, or combinations thereof" may refer to any one of A, B, C, or D; the combination of each of A, B, C, and D; and any sub-combination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," without limitation).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, without limitation" or "one or more of A, B, and C, without limitation." is used, in general such a construction is intended to include A alone, B alone, C alone, A and B together, A and C together, B and C together, or A, B, and C together, without limitation.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting examples of the disclosure may include:

Example 1: An apparatus, comprising: a Peripheral Component Interconnect Express (PCIe)-compliant interface provided at a PCIe domain of a switch; a link monitor provided at a switching fabric of the switch that supports the PCIe domain of the switch, the link monitor to: observe a factor-changing event of a state of a fabric link; and obtain a value at least partially responsive to a weight computation, the weight computation for a factor associated with the factor-changing event.

Example 2: The apparatus according to Example 1, wherein the state of the fabric link is at least partially responsive to one or more of a connection type, a data rate, a number of channels, a utilization, and a signal quality.

Example 3: The apparatus according to any of Examples 1 and 2, comprising a fabric manager, the fabric manager to update a routing table responsive to the value and a shortest path algorithm.

Example 4: The apparatus according to any of Examples 1 through 3, wherein the PCIe domain of the switch comprises a number of PCIe-compliant interfaces and wherein the routing table specifies on which of the PCIe-compliant interfaces of the PCIe domain to forward a frame according to a destination of the frame.

Example 5: The apparatus according to any of Examples 1 through 4, comprising a fabric manager, the fabric manager to update a routing table responsive to a received value and a shortest path algorithm.

Example 6: The apparatus according to any of Examples 1 through 5, wherein the received value was received from another link monitor of another switch.

Example 7: The apparatus according to any of Examples 1 through 6, wherein the fabric link is Compute Express Link (CXL) compliant.

Example 8: The apparatus according to any of Examples 1 through 7, wherein the link monitor is to broadcast the obtained value to another switch or to a fabric manager.

Example 9: A method comprising: observing, at a first switch, a factor-changing event that affects a state of a fabric link, the fabric link being a Peripheral Component Interconnect Express (PCIe)-compliant link between the first switch and a second switch; and obtaining a value at least partially responsive to a weight computation, the weight computation for a factor associated with the factor-changing event.

Example 10: The method according to Example 9, wherein the state of the fabric link is at least partially responsive to one or more of a connection type, a data rate, a number of channels, a utilization, and a signal quality.

Example 11: The method according to any of Examples 9 and 10, comprising updating a routing table responsive to the value and a shortest path algorithm.

Example 12: The method according to any of Examples 9 through 11, comprising broadcasting the obtained value at the fabric link to another switch or to a fabric manager.

Example 13: The method according to any of Examples 9 through 12, comprising: receiving a second value at the fabric link; and updating a routing table responsive to the second value.

Example 14: The method according to any of Examples 9 through 13, comprising: receiving a frame at the fabric link; and determining, at least partially responsible to a routing table, to provide the frame at another fabric link, the another fabric link being a PCIe-compliant link between the first switch and a third switch.

Example 15: A system comprising: at least two devices respectively comprising a switch-facing Peripheral Component Interconnect Express (PCIe)-compliant interface; and at least two switches, each of the switches comprising: a device-facing PCIe-compliant interface communicatively coupled to a switch-facing PCIe-compliant interface of a respective one of the at least two devices; and at least one network-facing PCIe-compliant interface, communicatively coupled to a network-facing PCIe-compliant interface of a neighboring one of the at least two switches, wherein the at least two switches are to respectively: observe a factor-changing event of a state of a fabric link between the respective switch and a neighboring switch; and obtain a value at least partially responsive to a weight computation, the weight computation for a factor associated with the factor-changing event.

Example 16: The system according to Example 15, wherein the state of the fabric link is at least partially responsive to one or more of a connection type, a data rate, a number of channels, a utilization, and a signal quality.

Example 17: The system according to any of Examples 15 and 16, wherein the at least two switches are respectively to update a respective routing table responsive to the value and a shortest path algorithm.

Example 18: The system according to any of Examples 15 through 17, wherein the at least two switches are respectively to broadcast the obtained value.

Example 19: The system according to any of Examples 15 through 18, wherein the at least two switches are to respectively update a respective routing table responsive to a received value and a shortest path algorithm.

Example 20: The system according to any of Examples 15 through 19, comprising a fabric manager communicatively coupled to the at least two switches, the fabric manager to update a routing table responsive to the value.

Example 21: The system according to any of Examples 15 through 20, wherein the fabric manager is to communicate updated routes in the routing table to one or more of the at least two switches.

Example 22: The system according to any of Examples 15 through 21, wherein the at least two switches are to respectively forward frames according to the communicated updated routes responsive to receiving the communicated updated routes.

Example 23: The system according to any of Examples 15 through 22, wherein the at least two switches are to respectively provide the obtained value to the fabric manager and the fabric manager is to update the routing table responsive to receiving the obtained value.

While the present disclosure has been described herein with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

What is claimed is:

1. An apparatus, comprising:

a Peripheral Component Interconnect Express (PCIe)-compliant interface provided at a PCIe domain of a switch;

a link monitor provided at a switching fabric of the switch that supports the PCIe domain of the switch, the link monitor separate from a fabric link and to:

observe a factor-changing event of a state of the fabric link; and obtain a value at least partially responsive to a weight computation, the weight computation for a factor associated with the factor-changing event.

2. The apparatus of claim 1, wherein the state of the fabric link is at least partially responsive to one or more of a connection type, a data rate, a number of channels, a utilization, and a signal quality.

3. An apparatus, comprising:

a Peripheral Component Interconnect Express (PCIe)-compliant interface provided at a PCIe domain of a switch;

a link monitor provided at a switching fabric of the switch that supports the PCIe domain of the switch, the link monitor to:

observe a factor-changing event of a state of a fabric link; and obtain a value at least partially responsive to a weight computation, the weight computation for a factor associated with the factor-changing event, and a fabric manager, the fabric manager to update a routing table responsive to the value and a shortest path algorithm.

4. The apparatus of claim 3, wherein the PCIe domain of the switch comprises a number of PCIe-compliant interfaces and wherein the routing table specifies on which of the PCIe-compliant interfaces of the PCIe domain to forward a frame according to a destination of the frame.

5. An apparatus, comprising:

a Peripheral Component Interconnect Express (PCIe)-compliant interface provided at a PCIe domain of a switch;

a link monitor provided at a switching fabric of the switch that supports the PCIe domain of the switch, the link monitor to:

observe a factor-changing event of a state of a fabric link; and obtain a value at least partially responsive to a weight computation, the weight computation for a factor associated with the factor-changing event, and a fabric manager, the fabric manager to update a routing table responsive to a received value and a shortest path algorithm.

6. The apparatus of claim 5, wherein the received value was received from another link monitor of another switch.

7. The apparatus of claim 1, wherein the fabric link is Compute Express Link (CXL) compliant.

8. An apparatus, comprising:

a Peripheral Component Interconnect Express (PCIe)-compliant interface provided at a PCIe domain of a switch;

a link monitor provided at a switching fabric of the switch that supports the PCIe domain of the switch, the link monitor to:

observe a factor-changing event of a state of a fabric link; and obtain a value at least partially responsive to a weight computation, the weight computation for a factor associated with the factor-changing event, wherein the link monitor is to broadcast the obtained value to another switch or to a fabric manager.

9. A method comprising:

observing, by a link monitor provided at a switching fabric that supports a PCIe domain of a first switch, a factor-changing event that affects a state of a fabric link, the fabric link being a Peripheral Component Interconnect Express (PCIe)-compliant link between the first switch and a second switch, the link monitor separate from the fabric link; and obtaining, by the passive link monitor, a value at least partially responsive to a weight computation, the weight computation for a factor associated with the factor-changing event.

10. The method of claim 9, wherein the state of the fabric link is at least partially responsive to one or more of a connection type, a data rate, a number of channels, a utilization, and a signal quality.

11. A method comprising:

observing, at a first switch, a factor-changing event that affects a state of a fabric link, the fabric link being a Peripheral Component Interconnect Express (PCIe)-compliant link between the first switch and a second switch;

obtaining a value at least partially responsive to a weight computation, the weight computation for a factor associated with the factor-changing event; and updating a routing table responsive to the value and a shortest path algorithm.

12. A method comprising:

observing, at a first switch, a factor-changing event that affects a state of a fabric link, the fabric link being a Peripheral Component Interconnect Express (PCIe)-compliant link between the first switch and a second switch;

obtaining a value at least partially responsive to a weight computation, the weight computation for a factor associated with the factor-changing event; and broadcasting the obtained value at the fabric link to another switch or to a fabric manager.

13. A method comprising:

observing, at a first switch, a factor-changing event that affects a state of a fabric link, the fabric link being a Peripheral Component Interconnect Express (PCIe)-compliant link between the first switch and a second switch;

obtaining a value at least partially responsive to a weight computation, the weight computation for a factor associated with the factor-changing event;

receiving a second value at the fabric link; and updating a routing table responsive to the second value.

14. The method of claim 9, comprising:

receiving a frame at the fabric link; and determining, at least partially responsible to a routing table, to provide the frame at another fabric link, the other fabric link being a PCIe-compliant link between the first switch and a third switch.

15. A system comprising:

at least two devices respectively comprising a switch-facing Peripheral Component Interconnect Express (PCIe)-compliant interface; and at least two switches, each of the switches comprising:

a device-facing PCIe-compliant interface communicatively coupled to a switch-facing PCIe-compliant interface of a respective one of the at least two devices; and at least one network-facing PCIe-compliant interface, communicatively coupled to a network-facing PCIe-compliant interface of a neighboring one of the at least two switches, wherein the at least two switches are to respectively include a link monitor provided at a switching fabric that supports a PCIe domain of the respective switch, the link monitor separate from a fabric link and to:

observe a factor-changing event of a state of the fabric link between the respective switch and a neighboring switch; and obtain a value at least partially responsive to a weight computation, the weight computation for a factor associated with the factor-changing event.

16. The system of claim 15, wherein the state of the fabric link is at least partially responsive to one or more of a connection type, a data rate, a number of channels, a utilization, and a signal quality.

17. A system comprising:

at least two devices respectively comprising a switch-facing Peripheral Component Interconnect Express (PCIe)-compliant interface; and at least two switches, each of the switches comprising:

a device-facing PCIe-compliant interface communicatively coupled to a switch-facing PCIe-compliant interface of a respective one of the at least two devices; and at least one network-facing PCIe-compliant interface, communicatively coupled to a network-facing PCIe-compliant interface of a neighboring one of the at least two switches, wherein the at least two switches are to respectively include a link monitor provided at a switching fabric that supports a PCIe domain of the respective switch, the link monitor to passively:

observe a factor-changing event of a state of a fabric link between the respective switch and a neighboring switch; and obtain a value at least partially responsive to a weight computation, the weight computation for a factor associated with the factor-changing event, wherein the at least two switches are respectively to update a respective routing table responsive to the value and a shortest path algorithm.

18. A system comprising:

at least two devices respectively comprising a switch-facing Peripheral Component Interconnect Express (PCIe)-compliant interface; and at least two switches, each of the switches comprising:

a device-facing PCIe-compliant interface communicatively coupled to a switch-facing PCIe-compliant interface of a respective one of the at least two devices; and at least one network-facing PCIe-compliant interface, communicatively coupled to a network-facing PCIe-compliant interface of a neighboring one of the at least two switches, wherein the at least two switches are to respectively include a link monitor provided at a switching fabric that supports a PCIe domain of the respective switch, the link monitor to passively:

observe a factor-changing event of a state of a fabric link between the respective switch and a neighboring switch; and obtain a value at least partially responsive to a weight computation, the weight computation for a factor associated with the factor-changing event, wherein the at least two switches are respectively to broadcast the obtained value.

19. A system comprising:

at least two devices respectively comprising a switch-facing Peripheral Component Interconnect Express (PCIe)-compliant interface; and at least two switches, each of the switches comprising:

a device-facing PCIe-compliant interface communicatively coupled to a switch-facing PCIe-compliant interface of a respective one of the at least two devices; and at least one network-facing PCIe-compliant interface, communicatively coupled to a network-facing PCIe-compliant interface of a neighboring one of the at least two switches, wherein the at least two switches are to respectively include a link monitor provided at a switching fabric that supports a PCIe domain of the respective switch, the link monitor to passively:

observe a factor-changing event of a state of a fabric link between the respective switch and a neighboring switch; and obtain a value at least partially responsive to a weight computation, the weight computation for a factor associated with the factor-changing event, wherein the at least two switches are to respectively update a respective routing table responsive to a received value and a shortest path algorithm.

20. A system comprising:

at least two devices respectively comprising a switch-facing Peripheral Component Interconnect Express (PCIe)-compliant interface; and at least two switches, each of the switches comprising:

a device-facing PCIe-compliant interface communicatively coupled to a switch-facing PCIe-compliant interface of a respective one of the at least two devices; and at least one network-facing PCIe-compliant interface, communicatively coupled to a network-facing PCIe-compliant interface of a neighboring one of the at least two switches, wherein the at least two switches are to respectively include a link monitor provided at a switching fabric that supports a PCIe domain of the respective switch, the link monitor to passively:

observe a factor-changing event of a state of a fabric link between the respective switch and a neighboring switch; and obtain a value at least partially responsive to a weight computation, the weight computation for a factor associated with the factor-changing event, and a fabric manager communicatively coupled to the at least two switches, the fabric manager to update a routing table responsive to the value.

21. The system of claim 20, wherein the fabric manager is to communicate updated routes in the routing table to one or more of the at least two switches.

22. The system of claim 21, wherein the at least two switches are to respectively forward frames according to the communicated updated routes responsive to receiving the communicated updated routes.

23. The system of claim 20, wherein the at least two switches are to respectively provide the obtained value to the fabric manager and the fabric manager is to update the routing table responsive to receiving the obtained value.

\* \* \* \* \*